US012343689B2

(12) United States Patent
Fujimoto (10) Patent No.: US 12,343,689 B2
(45) Date of Patent: Jul. 1, 2025

(54) BUBBLE GENERATING DEVICE AND BUBBLE GENERATING SYSTEM (71) Applicant: Murata Manufacturing Co., Ltd., Nagaokakyo (JP)

(72) Inventor: Katsumi Fujimoto, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 138 days.

(21) Appl. No.: 18/237,022

(22) Filed: Aug. 23, 2023

(65) Prior Publication Data
US 2023/0390712 A1 Dec. 7, 2023

Related U.S. Application Data (63) Continuation of application No. PCT/JP2022/007356, filed on Feb. 22, 2022.

(30) Foreign Application Priority Data

Mar. 9, 2021 (JP) ................. 2021-037605

(51) Int. Cl.
B01F 23/23 (2022.01)
B01F 23/231 (2022.01)

(52) U.S. Cl.
CPC ...... B01F 23/23105 (2022.01); B01F 23/238 (2022.01)

(58) Field of Classification Search
CPC .......... B01F 23/23105; B01F 23/238
USPC ............................ 261/81, DIG. 48
See application file for complete search history.

(56) References Cited

U.S. PATENT DOCUMENTS

| 7,009,326 | B1 | 3/2006 | Matsuo et al. |
| 11,434,891 | B2* | 9/2022 | Fujimoto ............... F04B 43/04 |
| 2020/0055087 | A1 | 2/2020 | Fujimoto et al. |
| 2021/0379542 | A1 | 12/2021 | Fujimoto et al. |

(Continued)

FOREIGN PATENT DOCUMENTS

| JP | 2001197594 A | 7/2001 |
| JP | 2004097851 A | 4/2004 |
| JP | 2006087984 A | 4/2006 |

(Continued)

OTHER PUBLICATIONS

English Machine Translation of WO 2023/228589 A1 (Year: 2023).*

(Continued)

Primary Examiner — Charles S Bushey
(74) Attorney, Agent, or Firm — Keating & Bennett, LLP (57) ABSTRACT A bubble generating device includes a vibration plate, a first cylindrical body, a spring portion, a second cylindrical body, and a piezoelectric element. The vibration plate includes openings, a first surface in contact with a liquid in a liquid tank, and a second surface in contact with a gas. The first cylindrical body has a first end portion supporting the vibration plate. The spring portion has a plate shape and supports a second portion of the first cylindrical body. The second cylindrical body has an end portion supporting the spring portion at a position outward of a position at which the first cylindrical body is supported. The piezoelectric element causes the spring portion to vibrate and is inward of a portion of a surface of the spring portion supported by the second cylindrical body.

19 Claims, 7 Drawing Sheets (56) References Cited

U.S. PATENT DOCUMENTS

2021/0380448 A1 12/2021 Fujimoto et al.

FOREIGN PATENT DOCUMENTS

| JP | 2016209825 A | 12/2016 |
|----|--------------|---------|
| WO | 2018207395 A1 | 11/2018 |
| WO | 2020189270 A1 | 9/2020 |
| WO | 2020189271 A1 | 9/2020 |
| WO | 2020189272 A1 | 9/2020 |
| WO | WO 2022/190571 A1 * | 9/2022 |
| WO | WO 2023/228589 A1 * | 11/2023 |

OTHER PUBLICATIONS

International Search Report in PCT/JP2022/007356, mailed Apr. 26, 2022, 3 pages.
Written Opinion in PCT/JP2022/007356, mailed Apr. 26, 2022, 3 pages.

* cited by examiner

BUBBLE GENERATING DEVICE AND BUBBLE GENERATING SYSTEM

CROSS REFERENCE TO RELATED APPLICATIONS

This application claims the benefit of priority to Japanese Patent Application No. 2021-037605 filed on Mar. 9, 2021 and PCT Application No. PCT/JP2021/047548 filed on Dec. 22, 2021, and is a Continuation Application of PCT Application No. PCT/JP2022/007356 filed on Feb. 22, 2022. The entire contents of each application are hereby incorporated herein by reference.

BACKGROUND OF THE INVENTION

1. Field of the Invention

The present invention relates to a bubble generating device and a bubble generating system.

2. Description of the Related Art

In recent years, water purification, wastewater treatment, fish farming, and so forth have been performed by using fine bubbles, and fine bubbles have been used in various fields. Thus, a bubble generating device that generates fine bubbles has been developed (Japanese Unexamined Patent Application Publication No. 2016-209825).

The bubble generating device described in Japanese Unexamined Patent Application Publication No. 2016-209825, generates fine bubbles by using a piezoelectric element. This bubble generating device uses bending vibration so as to cause a center portion of a vibration plate to vibrate up and down, and bubbles that are generated in fine holes of the vibration plate are torn into fine bubbles by the vibration.

SUMMARY OF THE INVENTION

In the bubble generating device described in Japanese Unexamined Patent Application Publication No. 2016-209825, depending on the type of a liquid that is put in a liquid tank, it may sometimes be difficult to tear bubbles, which are generated in the fine holes, by using vibration of the vibration plate so as to generate fine bubbles due to a high specific gravity of the liquid, a high surface tension of the liquid, a high viscosity of the liquid, or the like.

In order to generate fine bubbles by using the bubble generating device, it is necessary to cause the vibration plate to vibrate more strongly by using the piezoelectric element. However, when the vibration plate is caused to vibrate more strongly by the piezoelectric element, there is a problem in that the vibration of the vibration plate leaks to the liquid tank, causing the liquid tank itself to vibrate.

Accordingly, preferred embodiments of the present invention provide bubble generating devices and bubble generating systems that each effectively generates fine bubbles regardless of the type of a liquid put in a liquid tank.

A bubble generating device according to a preferred embodiment of the present disclosure is a bubble generating device attachable to a liquid tank and operable to generate fine bubbles in a liquid in the liquid tank. The bubble generating device includes a vibration plate including a plurality of openings and provided at a position at which a first surface of the vibration plate is in contact with the liquid in the liquid tank and at which a second surface of the vibration plate is in contact with a gas, a first cylindrical body including a first end portion supporting the vibration plate, a spring portion that has a plate shape and supports another end portion of the first cylindrical body, a second cylindrical body including a first end portion supporting the spring portion outward of a position at which the first cylindrical body is supported, and a piezoelectric element to cause the spring portion to vibrate. The piezoelectric element is positioned inward of a portion of a surface of the spring portion, the surface being supported by the second cylindrical body, and the portion of the surface being supported by the second cylindrical body.

A bubble generating system according to another preferred embodiment of the present disclosure includes the above-described bubble generating device and the liquid tank.

According to the present disclosure, the piezoelectric element is inward of the portion of the surface of the spring portion supported by the second cylindrical body so that fine bubbles can be effectively generated regardless of the type of the liquid that is put in the liquid tank. In addition, by setting the outer diameter of the first cylindrical body to be smaller than the outer diameter of the vibration plate, the size of the piezoelectric element can be reduced, so that the manufacturing costs can be reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiments

A bubble generating device according to the present preferred embodiment and a bubble generating system will be described in detail below with reference to the drawings. Note that, in the drawings, portions that are the same as each other or that correspond to each other are denoted by the same reference signs, and repeated description will be avoided.

Figure 1:
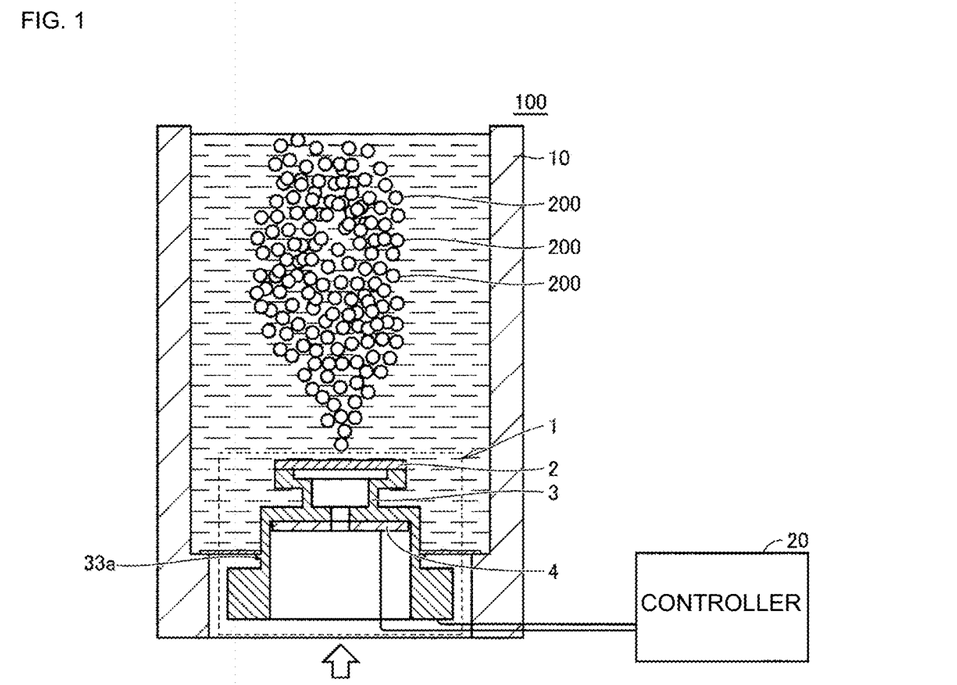
FIG. 1 is a schematic diagram of a bubble generating system including a bubble generating device according to the present preferred embodiment of the present invention.

First, FIG. 1 is a schematic diagram of a bubble generating system 100 that uses a bubble generating device 1 according to the present preferred embodiment. For example, the bubble generating device 1 illustrated in FIG. 1 is provided at a bottom portion of a liquid tank 10 that stores a liquid, such as water, gasoline, or light oil, and is used in the bubble generating system 100 that generates fine bubbles 200 in the liquid in the liquid tank 10. Note that the bubble generating system 100 can be applied to various systems such as a water purification apparatus, a wastewater treatment apparatus, a water tank for fish farming, and a fuel injection apparatus.

In addition, the liquid that is introduced into the liquid tank 10 varies depending on the system applied. The liquid is water in the case of a water purification apparatus, and the liquid is a liquid fuel in the case of a fuel injection apparatus. Furthermore, the liquid tank 10 only needs to be capable of temporarily storing a liquid and may be, for example, a liquid tank that includes a pipe into which a liquid is introduced and in which the liquid always flows through the pipe.

The bubble generating device 1 includes a vibration plate 2, a cylindrical body 3, and a piezoelectric element 4. The bubble generating device 1 is provided in a hole formed in a portion of the bottom of the liquid tank 10, and the piezoelectric element 4 causes the vibration plate 2 projecting through the hole toward the liquid to vibrate, so that the fine bubbles 200 are generated from a plurality of fine holes (openings) formed in the vibration plate 2.

The vibration plate 2 may be, for example, a resin plate, a metal plate, a Si substrate, a silicon on insulator (SOI) substrate, a porous ceramic plate, a glass plate, or the like. In the case where the vibration plate 2 is a glass plate, for example, the vibration plate 2 may be a glass plate that enables ultraviolet light and deep ultraviolet light each having a wavelength of about 200 nm to about 380 nm to pass therethrough, for example. When the vibration plate 2 is a glass plate that enables ultraviolet light and deep ultraviolet light, a light source that emits ultraviolet light to the liquid in the liquid tank 10 from the side on which another surface of the vibration plate 2 is located can be provided for both sterilization by ozone generation and sterilization by ultraviolet light radiation.

A plurality of fine holes are formed in the vibration plate 2. One surface of the vibration plate 2 is in contact with a liquid (e.g., water) in the liquid tank 10, and the other surface of the vibration plate 2 is in contact with a gas (e.g., air). In other words, in the bubble generating device 1, the liquid and the air are isolated from each other by the vibration plate 2, and a back pressure is applied to the other surface (in the direction of the arrow illustrated in FIG. 1). As a result, the gas is sent to the liquid in the liquid tank 10 through the plurality of fine holes. The bubble generating device 1 tears off the gas sent through the plurality of fine holes by using vibration of the vibration plate 2 so as to generate the fine bubbles 200.

More specifically, when the gas tries to come out from the plurality of fine holes, the surface tension of the liquid hinders the gas from entering the liquid. Simultaneously, the buoyancy of the gas counteracts the surface tension. The balance between the surface tension and the buoyancy determines the diameter of each of the bubbles 200, and vibration of the vibration plate 2 produces an effect of peeling the bubbles 200 off from wall surfaces of the fine holes as if the surface tension is reduced. As a result, the gas is torn off by the vibration of the vibration plate 2 in its early stage of coming off from the plurality of fine holes, and the fine bubbles 200 each having a diameter that is about one-tenth of that in the case where the vibration of the vibration plate 2 is not applied can be generated.

Although not illustrated, for example, the plurality of fine holes are formed in a region having a size of approximately 5 mm×5 mm defined in a center portion of the vibration plate 2 that has a diameter of about 14 mm, for example. When the hole size of each of the fine holes is set to about 1 µm and the interval between the fine holes is set to about 0.25 mm, 441 fine holes can be formed in the region, which has a size of approximately 5 mm×5 mm, for example.

Figure 2:
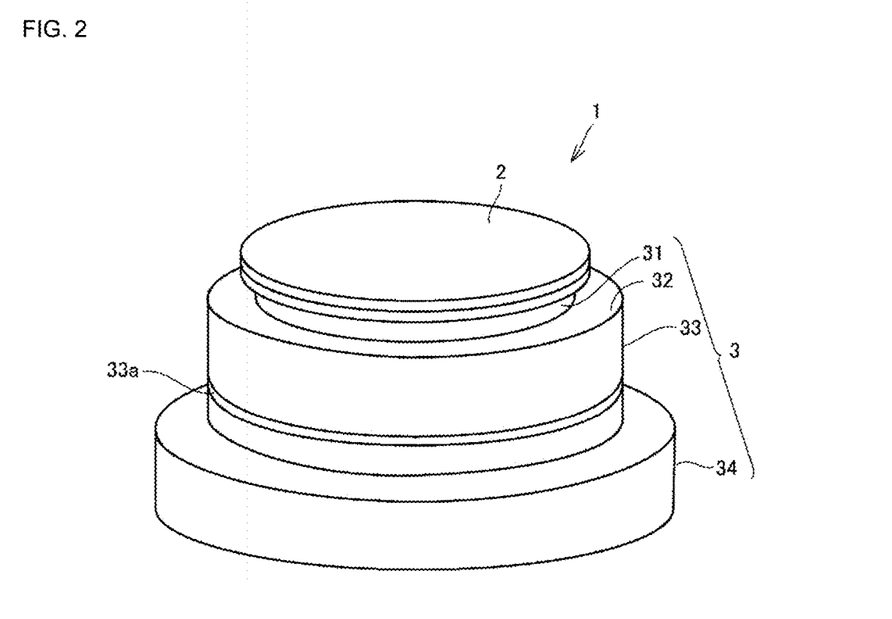
FIG. 2 is a perspective view of the bubble generating device according to the present preferred embodiment of the present invention.
Figure 3:
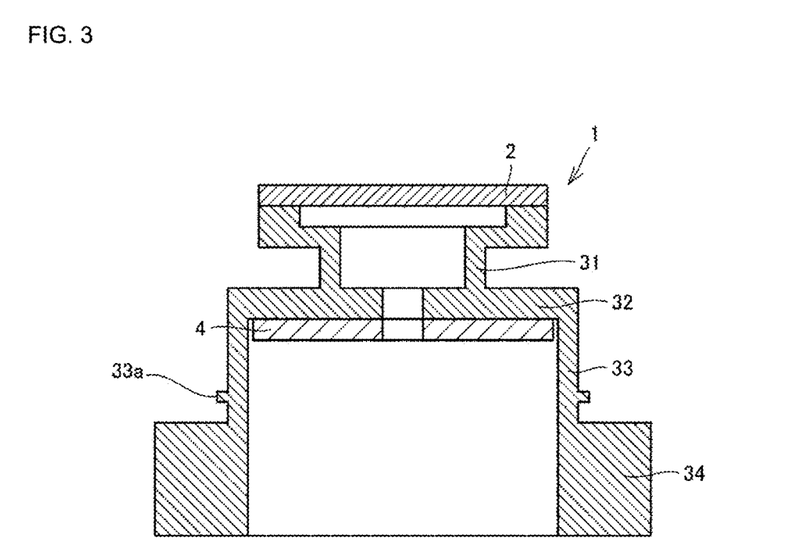
FIG. 3 is a sectional view of the bubble generating device according to the present preferred embodiment of the present invention.

In the bubble generating device 1, the piezoelectric element 4 causes the vibration plate 2 to vibrate via a cylindrical body 3. FIG. 2 is a perspective view of the bubble generating device 1 according to the present preferred embodiment. FIG. 3 is a sectional view of the bubble generating device according to the present preferred embodiment. The cylindrical body 3 illustrated in FIG. 1 includes a first cylindrical body 31, a spring portion 32, a second cylindrical body 33, and a weight portion 34 as illustrated in FIG. 3. Note that FIG. 3 is a sectional view of the bubble generating device 1 when the bubble generating device 1 is cut at its center in a direction in which the second cylindrical body 33 extends (the vertical direction in FIG. 3).

An end portion of the vibration plate 2 is held by an end portion of the first cylindrical body 31, which has a cylindrical shape. The vibration plate 2 is supported by the first cylindrical body 31 at a position where a direction in which the plurality of fine holes formed in the vibration plate 2 extend through the vibration plate 2 is parallel to a direction in which the first cylindrical body 31 vibrates. The outer diameter of the first cylindrical body 31 is smaller than the diameter of the vibration plate 2. For example, the diameter of the vibration plate 2 is about 14 mm, and the outer diameter of the first cylindrical body 31 is about 8 mm. An end portion of the first cylindrical body 31, the end portion being located on the side opposite to the side on which the vibration plate 2 is disposed, is supported by the spring portion 32. The spring portion 32 is a plate-shaped member that is elastically deformable. The spring portion 32 supports the bottom surface of the first cylindrical body 31, which has a cylindrical shape, and extends outward from the position where it supports the bottom surface of the first cylindrical body 31. The spring portion 32 has an annular shape, and the first cylindrical body 31 is provided on this annular shape.

The spring portion 32 is supported by the second cylindrical body 33 at a position outward of the position at which the spring portion 32 supports the first cylindrical body 31. The second cylindrical body 33 has a cylindrical shape. One end portion of the second cylindrical body 33 supports the spring portion 32. The weight portion 34 that has a cylindrical shape is provided at the outer side of another end portion of the second cylindrical body 33. Note that the shape, the position, and the mass of the weight portion 34 satisfy a condition in which driving that makes an outer end portion of the spring portion 32 or an outer side surface of the second cylindrical body 33 define and function as a node of vibration can be performed. The shape, the position, and the mass of the weight portion 34 are determined through a simulation that considers the other configurations of the bubble generating device 1 so as to satisfy the above condition. Obviously, the bubble generating device 1 does not necessarily include the weight portion 34 as long as the driving that makes the outer end portion of the spring portion 32 or the outer side surface of the second cylindrical body 33 define and function as a node of vibration can be performed.

The piezoelectric element 4 is provided at the lower surface of the spring portion 32 and has an annular shape so as to fit the shape of the spring portion 32. The piezoelectric element 4 vibrates in a direction in which the first cylindrical body 31 extends (the vertical direction in FIG. 3). The piezoelectric element 4 vibrates in the direction in which the first cylindrical body 31 extends so as to cause the spring portion 32 to vibrate in the direction in which the first cylindrical body 31 extends, so that the first cylindrical body 31 is displaced substantially uniformly in the vertical direction. Note that the piezoelectric element 4 may have a circular shape with the same diameter as the inner diameter of the second cylindrical body 33 and may completely cover the inside of the second cylindrical body 33. Note that it is more desirable that the shape, the position, and the mass of the weight portion 34 satisfy a condition in which driving that makes the vibration plate 2 vibrate vertically in parallel can be performed when the piezoelectric element 4 is driven. The shape, the position, and the mass of the weight portion 34 are determined through a simulation that considers the other configurations of the bubble generating device 1 so as to satisfy the above condition. Obviously, the bubble generating device 1 does not necessarily include the weight portion 34 as long as the driving that makes the vibration plate 2 vibrate vertically in parallel can be performed. In the case where the outer diameter of the first cylindrical body 31 is the same as the diameter of the vibration plate 2, it results in an increase in the outer diameter of the second cylindrical body 33. Consequently, the diameter of the piezoelectric element 4 also increases, which becomes a factor in an increase in the manufacturing costs. Thus, it is desirable that the diameter of the first cylindrical body 31 be smaller than the diameter of the vibration plate 2. More specifically, it is only necessary that a space ensuring that an amount of air required for generating bubbles is taken therein be formed in the first cylindrical body 31, and the smaller the outer diameter of the first cylindrical body 31, the smaller the diameter of the piezoelectric element 4 can be. Thus, the manufacturing costs can be reduced.

The first cylindrical body 31, the spring portion 32, the second cylindrical body 33, and the weight portion 34 are integrally formed. The first cylindrical body 31, the spring portion 32, the second cylindrical body 33, and the weight portion 34 are each made of, for example, a metal such as a stainless steel or a synthetic resin. Preferably, a metal having high rigidity such as a stainless steel is desirable. Note that the first cylindrical body 31, the spring portion 32, the second cylindrical body 33, and the weight portion 34 may be formed independently of one another or may be formed as different members. A method of joining the vibration plate 2 and the first cylindrical body 31 to each other is not particularly limited. The vibration plate 2 and the first cylindrical body 31 may be joined to each other by an adhesive, welding, fitting, press-fitting, or the like.

As illustrated in FIG. 1, the bubble generating device 1 is fitted, at the outer end portion of the spring portion 32 or the outer side surface of the second cylindrical body 33, in the hole formed in the portion of the bottom of the liquid tank 10. As will be described later, the outer end portion of the spring portion 32 or the outer side surface of the second cylindrical body 33 hardly vibrates even when the piezoelectric element 4 causes the vibration plate 2 to vibrate. Thus, it is virtually possible to cause only the vibration plate 2 to vibrate without transmitting the vibration of the piezoelectric element 4 to the liquid tank 10.

For example, the piezoelectric element 4 vibrates by being polarized in its thickness direction. The piezoelectric element 4 is made of a PZT-based piezoelectric ceramic. However, other piezoelectric ceramics such as (K,Na)NbO3 may be used. Alternatively, a piezoelectric single crystal such as LiTaO3 may be used.

In the bubble generating device 1, the vibration plate 2 that is in contact with the liquid is made of, for example, a glass plate, and the piezoelectric element 4 causes the vibration plate 2 to vibrate via the cylindrical body 3, so that the space into which the gas is introduced and the liquid can be completely isolated from each other. By completely isolating the space into which the gas is introduced and the liquid from each other, immersion of an electrical wiring line or the like of the piezoelectric element 4 in the liquid can be prevented. In addition, even in the case where the bubble generating device 1 is provided with a light source that emits ultraviolet light to the liquid in the liquid tank 10, the light source can be disposed in the space into which the gas is introduced, so that immersion of an electrical wiring line or the like of the light source in the liquid can be prevented.

Figure 4:
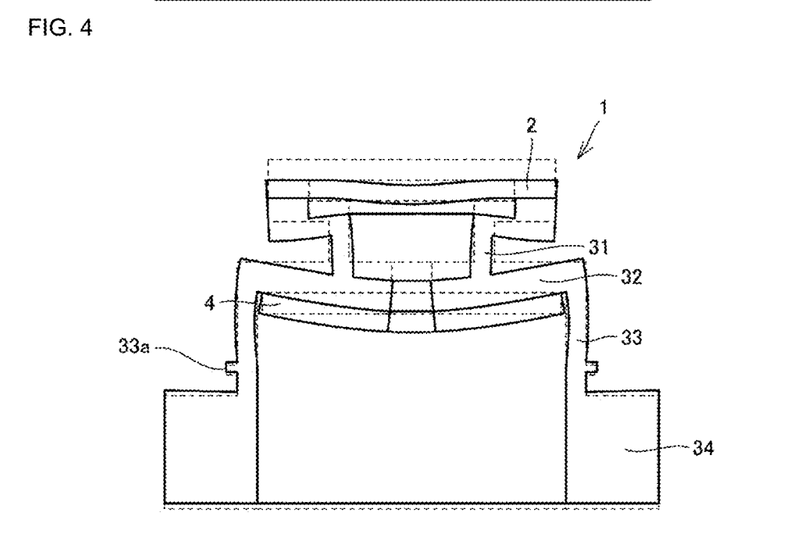
FIG. 4 is a diagram illustrating vibration of a vibration plate of the bubble generating device according to the present preferred embodiment of the present invention.

Vibration of the vibration plate 2 in the bubble generating device 1 will now be described in detail. FIG. 4 is a diagram illustrating vibration of the vibration plate 2 of the bubble generating device 1 according to the present preferred embodiment. FIG. 4 is a sectional view of the bubble generating device 1 and illustrates displacement resulting from a simulation of vibration of the vibration plate 2. In FIG. 4, a reference position of the bubble generating device 1 before vibration starts is indicated by a dashed line, and a position of the bubble generating device 1 after displacement is indicated by a solid line.

When the piezoelectric element 4 is caused, based on a driving signal from a controller 20 (see FIG. 1), to vibrate in the direction in which the first cylindrical body 31 extends, for example, the spring portion 32 is displaced downward as illustrated in FIG. 4. Along with the downward displacement of the spring portion 32 supporting the first cylindrical body 31, the entire first cylindrical body 31 is displaced downward, and as a result, the entire vibration plate 2 held by the first cylindrical body 31 is displaced downward. In this case, a node (a portion that is not displaced even by the vibration of the piezoelectric element 4) is formed at the outer end portion of the spring portion 32 or the outer side surface of the second cylindrical body 33. Thus, as a result of the outer end portion of the spring portion 32 or the outer side surface of the second cylindrical body 33 being coupled to the liquid tank 10, the vibration plate 2 can be caused to vibrate while substantially no vibration of the piezoelectric element 4 is transmitted to the liquid tank 10.

Although not illustrated, by causing the piezoelectric element 4 to continuously vibrate, the spring portion 32 is displaced downward, and then, the spring portion 32 is displaced upward. Along with the upward displacement of the spring portion 32 supporting the first cylindrical body 31, the entire first cylindrical body 31 is displaced upward, and as a result, the entire vibration plate 2 held by the first cylindrical body 31 is displaced upward.

In the bubble generating device 1 according to the present preferred embodiment, as described above, by causing the piezoelectric element 4 to vibrate, the entire vibration plate 2 is displaced substantially uniformly in the vertical direction while substantially no deformation occurs in the vibration plate 2 itself. Thus, in the bubble generating device 1, the vibration plate 2 is two-dimensionally driven by using vertical resonance of the spring portion 32, so that the same shear stress is applied to every portion of the vibration plate 2, and the gas sent thereinto through the plurality of fine holes of the vibration plate 2 is torn off by the shear stress in such a manner as to generate uniform bubbles. Note that, in the present preferred embodiment, substantially uniform vibration of the entire vibration plate 2 in the vertical direction will be referred to as spring vibration (piston vibration), and such a vibration mode will be referred to as a spring vibration mode.

Figure 5:
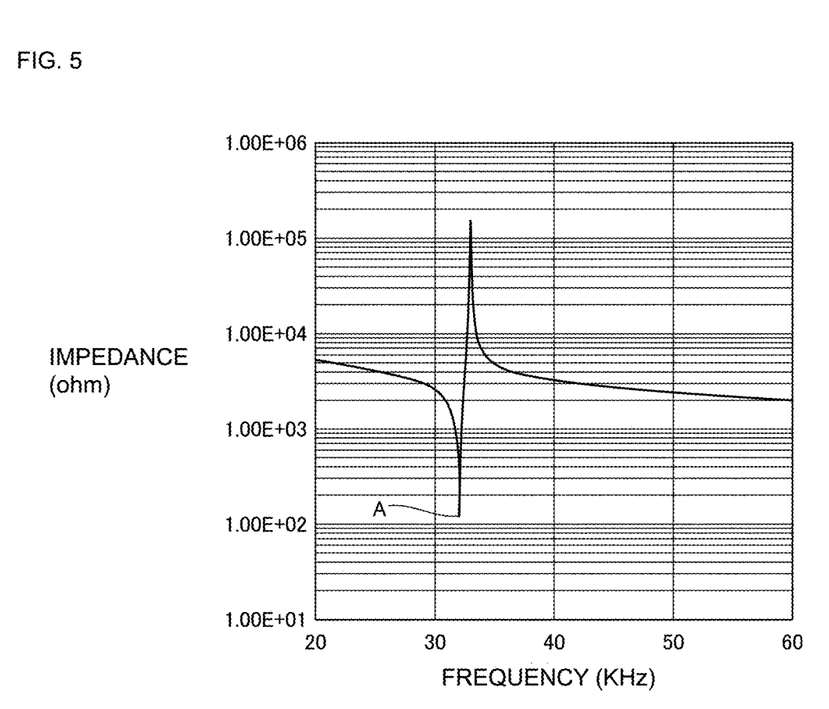
FIG. 5 is a graph illustrating a relationship between the frequency of a driving signal that is applied to a piezoelectric element of the bubble generating device according to the present preferred embodiment of the present invention and impedance.

In the bubble generating device 1, in the case where the vibration plate 2 is caused to vibrate in the spring vibration mode, the frequency of the driving signal that is applied to the piezoelectric element 4 is a resonant frequency. FIG. 5 is a graph illustrating a relationship between the frequency of the driving signal that is applied to the piezoelectric element 4 of the bubble generating device 1 according to the present preferred embodiment and impedance.

As is clear from FIG. 5, the impedance of the piezoelectric element 4 greatly changes at a frequency A that is about 32 kHz. The controller 20 drives the vibration plate 2 at the frequency A, so that the vibration plate 2 can be caused to vibrate in the spring vibration mode. This frequency A is the resonant frequency of the spring vibration mode.

Figure 6:
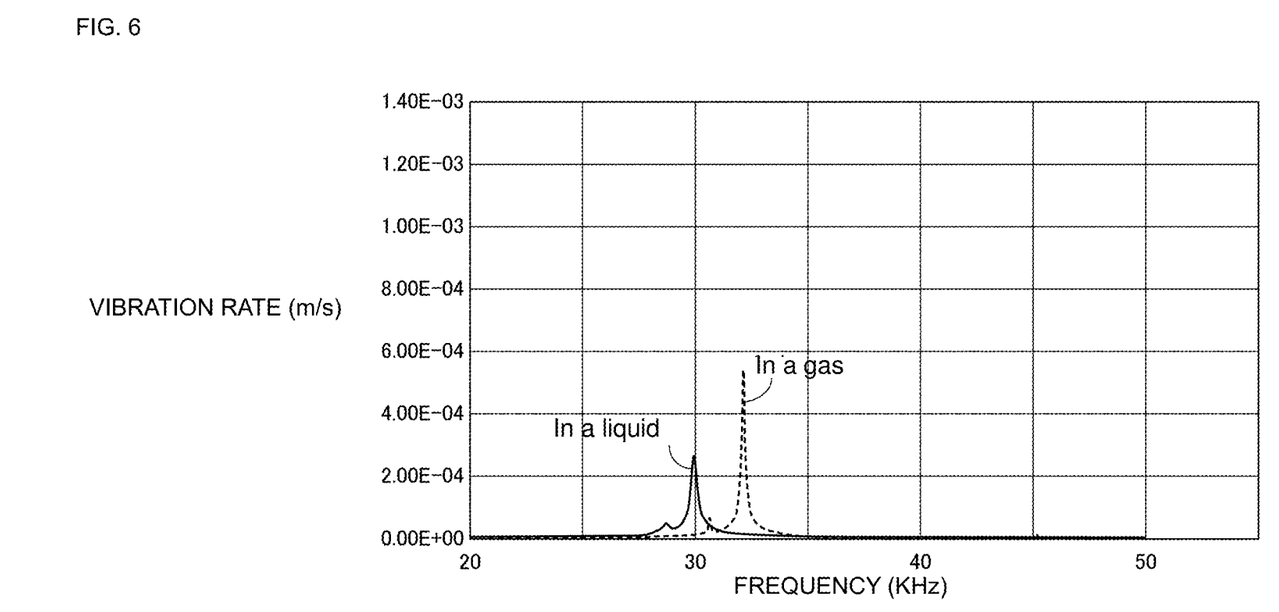
FIG. 6 is a diagram illustrating changes in resonant frequency when the vibration plate of the bubble generating device according to the present preferred embodiment of the present invention is driven in a gas and when the vibration plate is driven in a liquid.

The resonant frequency of the spring vibration mode varies between the case where the vibration plate 2 is driven in the gas and the case where the vibration plate 2 is driven in the liquid. FIG. 6 is a diagram illustrating changes in the resonant frequency when the vibration plate 2 of the bubble generating device 1 according to the present preferred embodiment is driven in the gas and when the vibration plate 2 is driven in the liquid.

As is clear from FIG. 6, when the vibration plate 2 is driven in the gas, a frequency of about 32 kHz defines and functions as the resonant frequency, for example, and the vibration rate of the vibration plate 2 reaches its maximum. In contrast, when the vibration plate 2 is driven in the liquid, a frequency of about 30 kHz defines and functions as the resonant frequency, for example, and the vibration rate of the vibration plate 2 reaches its maximum. Although the vibration rate in the case where the vibration plate 2 is driven in the liquid is lower than that in the case where the vibration plate 2 is driven in the gas, it is understood that the vibration plate 2 vibrates sufficiently also in the liquid. Thus, it is understood that the bubble generating device 1 generates a shear stress that is sufficient to tear off the gas, which is sent through the plurality of fine holes of the vibration plate 2, and to generate bubbles even when the vibration plate 2 is in the liquid.

Figure 7A:
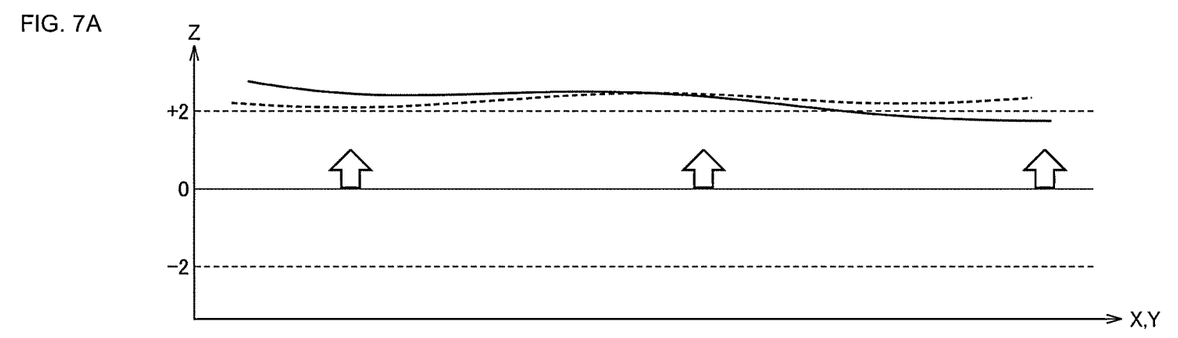
FIGS. 7A and 7B are diagrams illustrating the amount of displacement of the vibration plate of the bubble generating device according to the present preferred embodiment of the present invention when the vibration plate is driven in a gas and the amount of displacement of the vibration plate when the vibration plate is driven in a liquid.
Figure 7B:
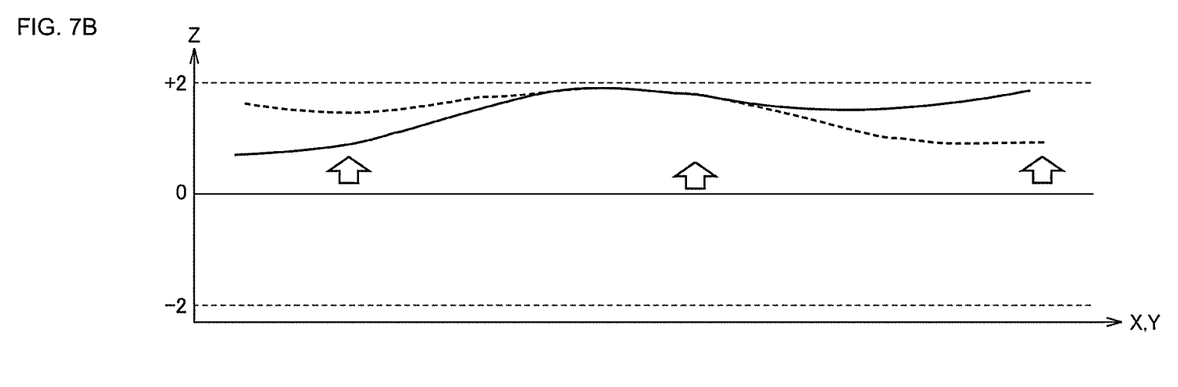

In addition, the amount of displacement of the vibration plate 2 when the vibration plate 2 is driven in the gas and the amount of displacement of the vibration plate 2 when the vibration plate 2 is driven in the liquid will now be compared. FIGS. 7A and 7B are diagrams illustrating the amount of displacement of the vibration plate 2 of the bubble generating device 1 according to the present preferred embodiment when the vibration plate 2 is driven in the gas and the amount of displacement of the vibration plate 2 when the vibration plate 2 is driven in the liquid. FIG. 7A is a diagram illustrating the amount of displacement of the vibration plate 2 when the vibration plate 2 is driven in in the gas, and FIG. 7B is a diagram illustrating the amount of displacement of the vibration plate 2 when the vibration plate 2 is driven in the liquid. Note that, in FIGS. 7A and 7B, the X direction corresponds to the vertical direction illustrated in FIG. 4, and the Y direction is a direction perpendicular to the X direction and the Z direction. In addition, in FIGS. 7A and 7B, the amount of displacement of the vibration plate 2 in the X direction is indicated by a solid line, and the amount of displacement of the vibration plate 2 in the Y direction is indicated by a dashed line. The arrows in FIGS. 7A and 7B each indicate a state in which the vibration plate 2 is displaced in the upward direction.

As seen from FIG. 7A, when the vibration plate 2 is driven at a voltage of 2 Vp-p in the gas, the vibration plate 2 is uniformly displaced by about 3.3 nm in terms of its peak value in an XY plane of the vibration plate 2, for example. In contrast, as seen from FIG. 7B, when the vibration plate 2 is driven in the liquid, the displacement amount at an end portion of the vibration plate 2 is smaller than that when the vibration plate 2 is driven in the gas. However, the center portion of the vibration plate 2 is uniformly displaced by about 2.0 nm in the XY plane of the vibration plate 2, for example. Although vibration of a vibration plate is usually suppressed to about 1/10 when the vibration plate is put in a liquid, and it is understood from this fact that, in the bubble generating device 1, the gas, which is sent through the plurality of fine holes of the vibration plate 2, is torn off by the vibration of the vibration plate 2 even when the vibration plate 2 is in the liquid, and a sufficient amount of bubbles are generated.

As described above, the bubble generating device 1 according to the present preferred embodiment is attached to the liquid tank 10 and generates fine bubbles in the liquid in the liquid tank 10. The bubble generating device 1 includes the vibration plate 2, the first cylindrical body 31, the spring portion 32, a second cylindrical body 33, and a piezoelectric element 4. The vibration plate 2 has the plurality of openings formed therein and is provided at a position where one surface thereof is in contact with the liquid in the liquid tank 10 and where the other surface thereof is in contact with the gas. One end portion of the first cylindrical body 31 supports the vibration plate 2. The spring portion 32 has a plate shape and supports the other end portion of the first cylindrical body 31. The one end portion of the second cylindrical body 33 supports the spring portion 32 at a position further outside than the position at which the first cylindrical body 31 is supported. The piezoelectric element 4 causes the spring portion 32 to vibrate. The piezoelectric element 4 is positioned inward of a portion of a surface of the spring portion 32, the surface being supported by the second cylindrical body 33, and the portion of the surface being supported by the second cylindrical body 33.

Accordingly, the piezoelectric element 4 can be provided at a portion of the surface of the spring portion 32, the portion being located inside the above-mentioned portion of the spring portion 32 that is supported by the second cylindrical body 33, on the side on which it is supported by the second cylindrical body 33, and thus, the bubble generating device 1 can effectively generate fine bubbles regardless of the type of the liquid that is put in the liquid tank 10.

It is preferable that the piezoelectric element 4 be provided such that a portion of the surface of the spring portion 32, the surface being supported by the second cylindrical body 33, and the portion of the surface having the same diameter as the inner diameter of the second cylindrical body 33, is entirely covered with the piezoelectric element 4. As a result, fine bubbles can be more effectively generated.

The bubble generating device 1 is in contact, at the outer end portion of the spring portion 32 or the outer side surface of the second cylindrical body 33, with the liquid tank 10, and it is preferable that the bubble generating device 1 further include the controller 20 (a control unit) that is capable of controlling the driving of the piezoelectric element 4. The resonant frequency of the piezoelectric element 4 fluctuates more as a result of the liquid tank 10 being filled with the liquid compared with the case where the piezoelectric element 4 is in the gas. It is preferable that the controller 20 search while frequency-sweeping a drive frequency such that the outer end portion of the spring portion 32 or the outer side surface of the second cylindrical body 33 defines and functions as a node of vibration and control the driving of the piezoelectric element 4. As a result, the vibration plate 2 can be caused to vibrate while substantially no vibration of the piezoelectric element 4 is transmitted to the liquid tank 10.

It is preferable that the bubble generating device 1 further include the weight portion 34 that is provided at the other end portion of the second cylindrical body 33. It is preferable that the weight portion 34 have a shape, a position, and a mass that satisfy a condition in which driving that makes the outer end portion of the spring portion 32 or the outer side surface of the second cylindrical body 33 define and function as a node of vibration can be performed when the piezoelectric element 4 is driven. This makes it easier to perform the driving that makes the outer end portion of the spring portion 32 or the outer side surface of the second cylindrical body 33 define and function as a node of vibration.

It is preferable that the weight portion 34 have a shape, a position, and a mass that satisfy a condition in which driving that makes the vibration plate 2 vibrate vertically in parallel can be performed when the piezoelectric element 4 is driven. This makes it easier to perform the driving that makes the vibration plate 2 vibrate vertically in parallel.

It is preferable that the vibration plate 2 be supported by the first cylindrical body 31 at the position where the direction in which the plurality of fine holes formed in the vibration plate 2 extend through the vibration plate 2 is parallel to the direction in which the first cylindrical body 31 vibrates. As a result, the direction in which the first cylindrical body 31 vibrates can be parallel to a direction in which buoyancy is generated in the gas.

First Modification

Figure 8:
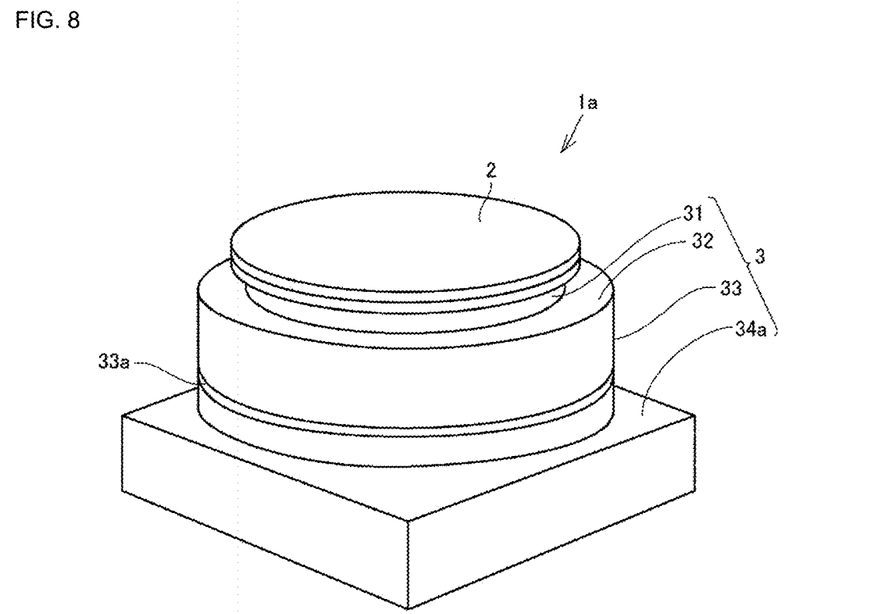
FIG. 8 is a perspective view of a bubble generating device according to a first modification of a preferred embodiment of the present invention.

In the bubble generating device 1 according to the above-described preferred embodiment, although the shape of the weight portion 34 is a cylindrical shape that follows the shape of the second cylindrical body 33. However, the shape of the weight portion 34 is not limited to this. The shape of the weight portion may be, for example, a rectangular shape when viewed from the surface of the vibration plate 2 that is in contact with the liquid. FIG. 8 is a perspective view of a bubble generating device 1a according to a first modification of a preferred embodiment of the present invention. Note that components of the bubble generating device 1a illustrated in FIG. 8 that are the same as those of the bubble generating device 1 illustrated in FIG. 2 are denoted by the same reference signs, and detailed descriptions thereof will not be repeated.

A weight portion 34a that has a quadrangular columnar shape is provided at the outer side of the other end portion of the second cylindrical body 33. Note that the shape, the position, and the mass of the weight portion 34a satisfy a condition in which driving that makes the outer end portion of the spring portion 32 or the outer side surface of the second cylindrical body 33 define and function as a node of vibration can be performed and a condition in which driving that makes the vibration plate 2 vibrate vertically in parallel can be performed. The shape, the position, and the mass of the weight portion 34a are determined through a simulation that considers the other configurations of the bubble generating device 1a so as to satisfy the above condition.

Second Modification

Figure 9:
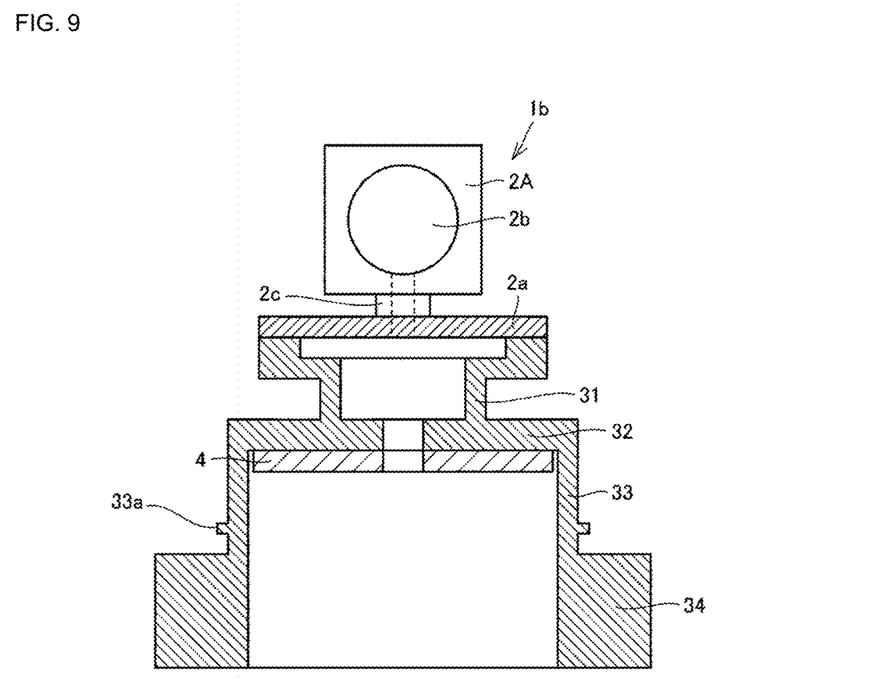
FIG. 9 is a sectional view of a bubble generating device according to a second modification of a preferred embodiment of the present invention.

In the bubble generating device 1 according to the above-described preferred embodiment, although the vibration plate 2 is supported by the first cylindrical body 31 at a position where the direction in which the plurality of fine holes formed in the vibration plate 2 extend through the vibration plate 2 is parallel to the direction in which the first cylindrical body 31 vibrates, the present disclosure is not limited to this. For example, the vibration plate may have a structure in which the direction in which the plurality of openings extend through the vibration plate 2 is perpendicular to the direction in which the first cylindrical body vibrates. FIG. 9 is a sectional view of a bubble generating device 1b according to a second modification of a preferred embodiment of the present invention. Note that components of the bubble generating device 1b illustrated in FIG. 9 that are the same as those of the bubble generating device 1 illustrated in FIG. 3 are denoted by the same reference signs, and detailed descriptions thereof will not be repeated.

Instead of forming a plurality of fine holes (openings) in a vibration plate 2a that is held by an end portion of the first cylindrical body 31, a structure 2A including plates 2b each of which has a plurality of fine holes and each of which is disposed so as to be oriented in a direction perpendicular to the vibration plate 2a is provided. The structure 2A has a hollow, quadrangular columnar shape, and the plates 2b are provided at two opposite surfaces of the quadrangular columnar shape. A hollow portion of the structure 2A and the first cylindrical body 31 are connected to each other by a hollow column 2c, and the gas is sent to the hollow portion of the structure 2A from the first cylindrical body 31.

The gas sent to the hollow portion of the structure 2A is discharged to the side on which the liquid is present through the plurality of fine holes formed in the plates 2b. The gas discharged to the side on which the liquid is present through the plurality of fine holes is torn into the fine bubbles 200 by the plates 2b that are caused to vibrate in a direction perpendicular to the vibration plate 2a. In the bubble generating device 1b, when the piezoelectric element 4 are driven, the vibration plate 2a vibrates vertically in parallel, and thus, a direction in which the plurality of fine holes formed in the plates 2 extend through the plates 2 vibrates vertically with respect to the vibration plate 2a. Thus, a shearing stress larger than the shearing stress that is generated when the vibration plate 2 is caused to vibrate vertically can be applied, by the plates 2b that vibrate in the direction perpendicular to the vibration plate 2a, to the gas discharged to the side on which the liquid is present through the plurality of fine holes. In addition, since the bubbles 200 come out to the side on which the liquid is present from the direction perpendicular to the vibration plate 2a, the bubbles 200 do not receive a sound pressure due to ultrasonic waves that are generated by the vibration of the vibration plate 2a and will not be forcibly raised by the sound pressure.

In addition, since the plates 2*b* each having the plurality of fine holes are included in the structure 2A, and the driving of the piezoelectric element 4 causes the structure 2A to vibrate vertically via the vibration plate 2*a*, the driving of the piezoelectric element 4 is not directly applied to the plates 2*b*, so that the plates 2*b* become less likely to perform bending vibration. Since the plates 2*b* become less likely to perform bending vibration, each of the plates 2*b* can be prevented from breaking due to its bending deformation even if a thinner vibration plate is used. The critical aspect ratio of fine hole processing is constant, and thus, as the plate thickness decreases, it becomes easier to form fine holes. In other words, even if a plurality of finer holes are formed in the plates 2*b*, the plates 2*b* will not easily break. For example, a fine hole having a lower limit of about 2 µm or less can be processed to about 0.5 µm in an SOI substrate and the plates 2*b*.

Figure 10:
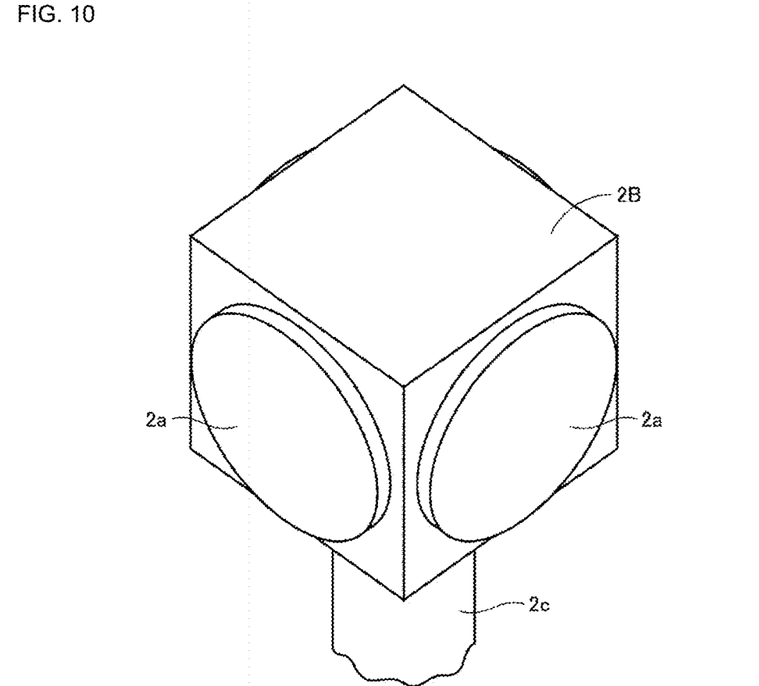
FIG. 10 is a perspective view of another structure.

Note that the structure of the structure 2A is not limited to the structure illustrated in FIG. 9. In the structure 2A illustrated in FIG. 9, although the plates 2*b* are provided at the two opposite surfaces of the quadrangular columnar shape, the plates 2*b* may be provided at four surfaces of a cube. FIG. 10 is a perspective view of another structure 2B. The structure 2B is a hollow cube, and the plates 2*b* are provided at four side surfaces of the cube. A hollow portion of the structure 2B and the first cylindrical body 31 are connected to each other by the hollow column 2*c*, and the gas is sent to the hollow portion of the structure 2B from the first cylindrical body 31. In the structure 2B, the bubbles 200 can be generated from the four surfaces of the cube.

Figure 11:
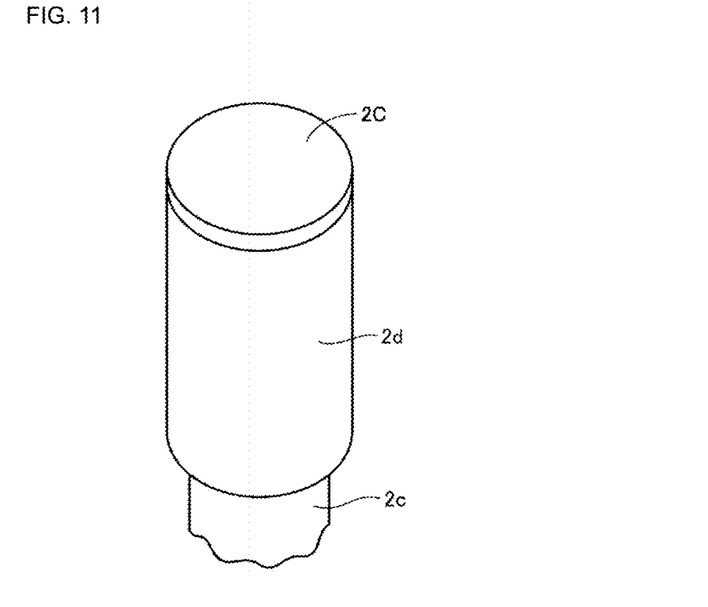
FIG. 11 is a perspective view of another structure.

Alternatively, the shape of the structure is not limited to a hollow, quadrangular columnar shape and may be a hollow cylindrical shape. FIG. 11 is a perspective view of another structure 2C. The structure 2C has a hollow cylindrical shape, and a cylinder member 2*d* having a plurality of fine holes is provided at the side surface of the cylindrical shape. A hollow portion of the structure 2C and the first cylindrical body 31 are connected to each other by the hollow column 2*c*, and the gas is sent to the hollow portion of the structure 2C from the first cylindrical body 31. In the structure 2C, the bubbles 200 can be generated from the entire circumferential portion of the cylindrical shape.

It is preferable that the vibration plate 2*a* include the structures 2A to 2C in each of which the direction in which the plurality of fine holes extend through is perpendicular to the direction in which the first cylindrical body 31 vibrates. This can protect the bubbles 200 against ultrasonic waves, and the shearing stress of each of the plates 2*b* or the shearing stress of the cylinder member 2*d* is enhanced, which makes the plates 2*b* less likely to break. Note that it is preferable that the structures be cylindrical bodies. As a result, the bubbles 200 can be generated from the entire circumferential portion of the structure 2C.

The second cylindrical body 33 may be provided with the flange portion 33*a* as illustrated in FIG. 2 and may be coupled to the liquid tank 10 with the flange portion 33*a* interposed therebetween. As a result, in the bubble generating system 100 including the bubble generating device 1 and the liquid tank 10, the airtightness between the bubble generating device 1 and the liquid tank 10 is improved. In addition, since the bubble generating device 1 is coupled, at the side surface of the second cylindrical body 33, to the liquid tank 10, only the vibration plate 2 can be caused to vibrate without transmitting the vibration of the piezoelectric element 4 to the liquid tank 10.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A bubble generating device attachable to a liquid tank and operable to generate fine bubbles in a liquid in the liquid tank, the bubble generating device comprising:
   a vibration plate including a plurality of openings and at a position at which a first surface of the vibration plate is in contact with the liquid in the liquid tank and at which a second surface of the vibration plate is in contact with a gas;
   a first cylindrical body that includes a first end portion supporting the vibration plate;
   a spring portion that has a plate shape and that supports a second end portion of the first cylindrical body;
   a second cylindrical body that includes a first end portion supporting the spring portion at a position outward of a position at which the first cylindrical body is supported; and
   a piezoelectric element to cause the spring portion to vibrate; wherein
   the piezoelectric element is positioned inward of a portion of a surface of the spring portion supported by the second cylindrical body.

2. The bubble generating device according to claim 1, wherein a portion of a surface of the spring portion supported by the second cylindrical body and having a diameter equal to an inner diameter of the second cylindrical body is entirely covered by the piezoelectric element.

3. The bubble generating device according to claim 1, wherein
   an outer end portion of the spring portion or an outer side surface of the second cylindrical body is in contact with the liquid tank;
   the bubble generating device further comprises a controller to control driving of the piezoelectric element; and
   the controller is configured or programmed to control driving of the piezoelectric element such that the outer end portion of the spring portion or the outer side surface of the second cylindrical body defines and function as a node of vibration.

4. The bubble generating device according to claim 3, further comprising:
   a weight at a second end portion of the second cylindrical body; wherein
   the weight has a shape, a position, and a mass that satisfy a condition in which driving that causes the outer end portion of the spring portion or the outer side surface of the second cylindrical body to define and function as a node of vibration can be performed when the piezoelectric element is driven.

5. The bubble generating device according to claim 4, wherein the weight portion has a shape, a position, and a mass that satisfy a condition in which driving that causes the vibration plate to vibrate vertically in parallel can be performed when the piezoelectric element is driven.

6. The bubble generating device according to claim 4, wherein the weight portion has a rectangular or substantially rectangular shape when viewed from a surface of the vibration plate that is in contact with liquid.

7. The bubble generating device according to claim 1, wherein the vibration plate is supported by the first cylindrical body at a position at which a direction in which the plurality of openings in the vibration plate extend through the vibration plate is parallel or substantially parallel to a direction in which the first cylindrical body vibrates.

8. The bubble generating device according to claim 1, wherein the vibration plate includes a structure in which a direction in which the plurality of openings extend through the vibration plate is perpendicular to a direction in which the first cylindrical body vibrates.

9. The bubble generating device according to claim 8, wherein the structure has a cylindrical body.

10. A bubble generating system comprising:
the bubble generating device according to claim 1; and
the liquid tank.

11. The bubble generating system according to claim 10, wherein the bubble generating device is coupled, at a side surface of the second cylindrical body, to the liquid tank.

12. The bubble generating system according to claim 10, wherein a portion of a surface of the spring portion supported by the second cylindrical body and having a diameter equal to an inner diameter of the second cylindrical body is entirely covered by the piezoelectric element.

13. The bubble generating system according to claim 10, wherein
an outer end portion of the spring portion or an outer side surface of the second cylindrical body is in contact with the liquid tank;
the bubble generating device further comprises a controller to control driving of the piezoelectric element; and
the controller is configured or programmed to control driving of the piezoelectric element such that the outer end portion of the spring portion or the outer side surface of the second cylindrical body defines and function as a node of vibration.

14. The bubble generating system according to claim 13, wherein the bubble generating device further comprises:
a weight at a second end portion of the second cylindrical body; wherein
the weight has a shape, a position, and a mass that satisfy a condition in which driving that causes the outer end portion of the spring portion or the outer side surface of the second cylindrical body to define and function as a node of vibration can be performed when the piezoelectric element is driven.

15. The bubble generating system according to claim 14, wherein the weight portion has a shape, a position, and a mass that satisfy a condition in which driving that causes the vibration plate to vibrate vertically in parallel can be performed when the piezoelectric element is driven.

16. The bubble generating system according to claim 14, wherein the weight portion has a rectangular or substantially rectangular shape when viewed from a surface of the vibration plate that is in contact with liquid.

17. The bubble generating system according to claim 10, wherein the vibration plate is supported by the first cylindrical body at a position at which a direction in which the plurality of openings in the vibration plate extend through the vibration plate is parallel or substantially parallel to a direction in which the first cylindrical body vibrates.

18. The bubble generating system according to claim 10, wherein the vibration plate includes a structure in which a direction in which the plurality of openings extend through the vibration plate is perpendicular to a direction in which the first cylindrical body vibrates.

19. The bubble generating system according to claim 18, wherein the structure has a cylindrical body.

* * * * *